(12) United States Patent
Gallegos

(10) Patent No.: US 8,057,605 B2
(45) Date of Patent: Nov. 15, 2011

(54) WIND TURBINE TOWER WASHING APPARATUS AND METHOD

(76) Inventor: Frank J. Gallegos, Santa Rosa, NM (US)

( * ) Notice: Subject to any disclaimer, the term of this patent is extended or adjusted under 35 U.S.C. 154(b) by 730 days.

(21) Appl. No.: 12/178,005

(22) Filed: Jul. 23, 2008

(65) Prior Publication Data
US 2010/0018551 A1 Jan. 28, 2010

(51) Int. Cl.
*B08B 3/02* (2006.01)
*B08B 1/00* (2006.01)

(52) U.S. Cl. .................. 134/6; 134/34; 134/172; 15/98; 15/103

(58) Field of Classification Search .................... 15/21.1, 15/50.3, 98, 103, 302; 134/6, 34, 172
See application file for complete search history.

(56) References Cited

U.S. PATENT DOCUMENTS

| 615,627 | A | | 12/1898 | Meinecke | |
|---|---|---|---|---|---|
| 1,471,935 | A | * | 10/1923 | Arentz | 114/222 |
| 3,298,052 | A | * | 1/1967 | Wolfe | 15/302 |
| 3,863,393 | A | * | 2/1975 | Goff | 451/92 |
| 4,112,535 | A | * | 9/1978 | Wild et al. | 15/98 |
| 4,433,639 | A | | 2/1984 | Brown | |
| 5,065,838 | A | * | 11/1991 | Finley | 182/38 |
| 5,226,973 | A | | 7/1993 | Chapman et al. | |
| 5,249,326 | A | * | 10/1993 | Jefferies et al. | 15/50.1 |
| 2001/0013434 | A1 | * | 8/2001 | Hopkins | 180/7.1 |
| 2005/0042102 | A1 | | 2/2005 | Teichert | |
| 2006/0175465 | A1 | | 8/2006 | Teichert | |
| 2007/0007074 | A1 | | 1/2007 | Lemburg et al. | |
| 2007/0056801 | A1 | | 3/2007 | Iversen | |

FOREIGN PATENT DOCUMENTS

DE WO2007006259 A1 1/2007
WO WO 2005054672 A1 * 6/2005

OTHER PUBLICATIONS

Machine Translation of WO 2007006259 to Paulsen, Jan. 2007.*

* cited by examiner

*Primary Examiner* — Michael Barr
*Assistant Examiner* — Benjamin Osterhout
(74) *Attorney, Agent, or Firm* — Dennis F. Armijo

(57) ABSTRACT

A system and method for cleaning tapered towers such wind turbine towers. A semicircular member hugs the tower surface. A plurality of nozzles affixed to the semicircular member sprays high pressure cleaning fluid on the tower surface as the semicircular member is raised and lowered. The spray nozzles are kept at a constant distance from the tower surface by a plurality of wheels affixed to the semicircular member. At least one constricting structure is used to force the plurality of wheels to be in constant contact with the tower surface. The constricting structure can be a spring loaded scissor apparatus and/or a bungee cord with rolling beads. A brush can be optionally added to the semicircular member to aid in cleaning.

19 Claims, 5 Drawing Sheets

WIND TURBINE TOWER WASHING APPARATUS AND METHOD

BACKGROUND OF THE INVENTION

1. Field of the Invention (Technical Field)

The presently claimed invention relates to washing systems and more particularly to washing tapered towers such as wind towers.

2. Background Art

Due to ever increasing costs and pollution caused by fossil fuels, there has been a surge in alternative or renewable energy sources. One is the use of wind energy to produce electricity. This involves the use of giant wind turbines that are driven by large blade assemblies. The turbines and blade assemblies are mounted on wind towers. Typically these wind towers are several hundred feet tall with a large base and tapered to the top of the tower. The turbines are filled with oil, which typically leaks onto the tower. In addition, the towers are subjected to all types of weather conditions, which affect the appearance of the towers. Presently, washing or cleaning of wind towers is done manually with cleaning personnel riding on cherry pickers or raised platforms using brushes or high-powered liquid washing sprayers to perform cleaning operations. These methods are dangerous because the personnel are working several hundred feet from the ground and inefficient because of the amount of time needed to move the basket of the cherry picker or the platform. A system is needed whereby a wind tower can be cleaned without endangering cleaning personnel by lifting or hoisting them on the tower. The preferred system is a method and apparatus that performs the cleaning operation, while the cleaning personnel remain on the ground surface, and it washes the wind towers as effectively as the aforementioned prior art systems.

SUMMARY OF THE INVENTION

Disclosure of the Invention

The presently claimed invention overcomes the shortcomings of the prior art by the use of an automatic washing or cleaning system for wind towers. The apparatus is a semi-circular tube with a plurality of spray nozzles affixed to it for spraying high pressure fluid on the surface of the wind tower. The high pressure fluid can be delivered via a high pressure hose with a commercial high pressure sprayer. The apparatus is raised and lowered with a winch or the like, thus not requiring a user to be present at the cleaning site. The apparatus has rolling members or wheels that contact the surface of the wind tower and keep the spray nozzles a constant distance from the tower surface for effective cleaning. The apparatus has a unique constricting feature to keep the wheel in constant contact with the tower surface even though the towers are tapered. This is accomplished with a bungee or spring loaded cord that contracts as the diameter of the tower decreases when the apparatus is lifted. This can also be accomplished by a spring loaded scissor system affixed to the tube. Brushes can be affixed to the tube to further aid in cleaning the tower surface.

The method for cleaning a wind tower is also disclosed. The cleaning system is assembled around the base of a tower. The tube portions are connected via high pressure connections and the compressing system is affixed by extending the bungee cord and/or extending the spring loaded scissor apparatus to its widest operation. The high pressure hose is attached to the system and the winching apparatus is hooked to the system. Counter balance weights are added to the system frame until optimum balance is reached. The high pressure fluid is delivered to the tube, causing the fluid to exit the spray nozzles, contacting the tower surface. The lifting device, such as a winch, is activated, lifting the system. As the system is lifted, the compressing system keeps the wheels in contact with the tower surface. The system can be lifted and lowered several times to optimally clean the tower surface. Additionally, brushes can be affixed to the cleaning system to brush the surface when the system is raised and lowered. The brushes can be adjusted to contact the tower surface.

An object of the presently claimed invention is avoid cleaning personnel from having to manually clean the tower surface several hundred feet from the ground.

An advantage of the presently claimed invention is since the system is automatic, it requires less time to assemble and clean the tower surfaces.

Other objects, advantages and novel features, and further scope of applicability of the presently claimed invention will be set forth in part in the detailed description to follow, taken in conjunction with the accompanying drawings, and in part will become apparent to those skilled in the art upon examination of the following, or may be learned by practice of the claimed invention. The objects and advantages of the claimed invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS

Best Modes for Carrying Out the Invention

Figure 1:
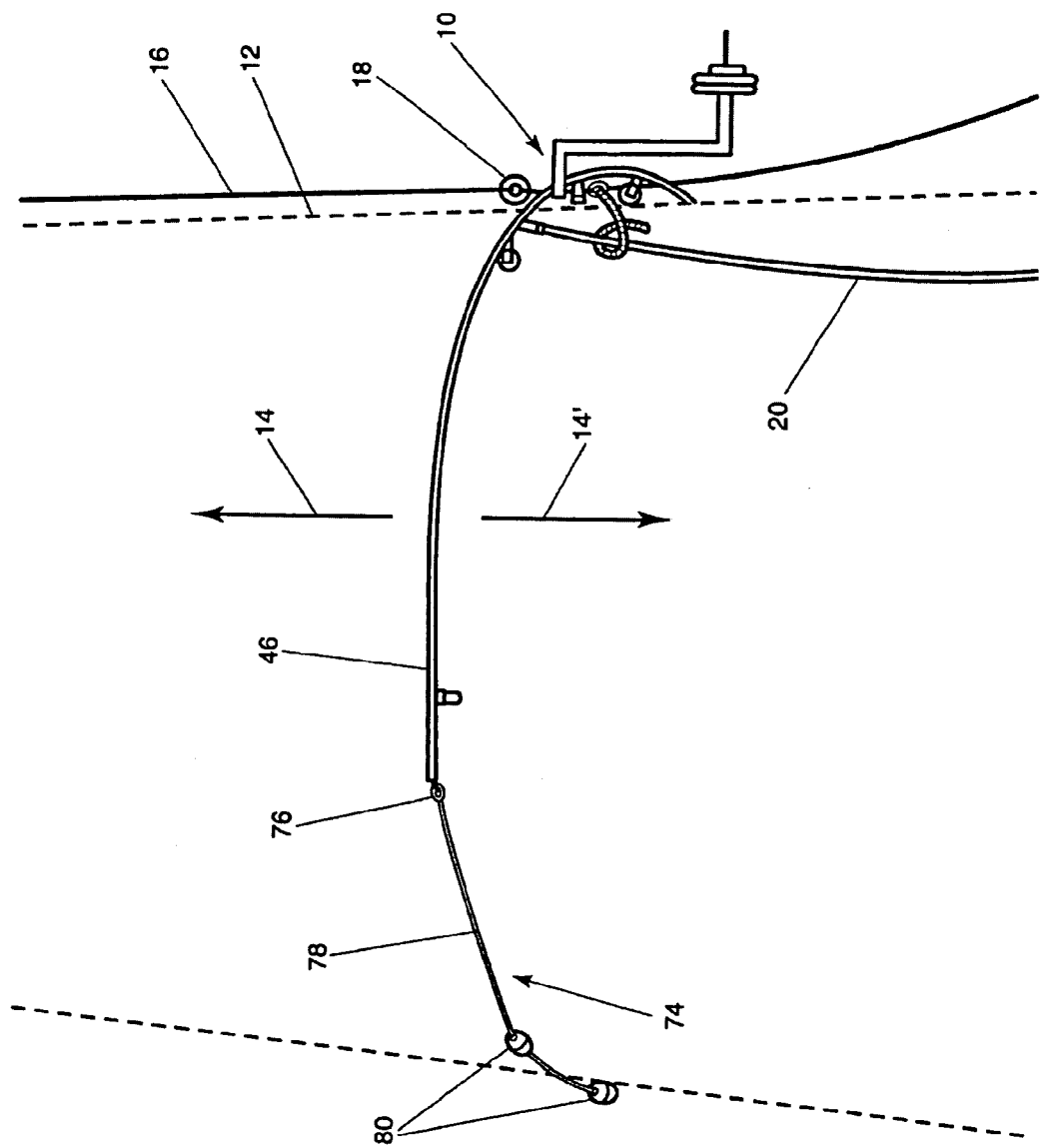
FIG. 1 shows the tower washer disposed on a tower.

FIG. 1 shows the tower washing system 10 disposed on a tower 12. As signified by arrows 14 and 14', tower washing system 10 is raised and lowered by the operators from the ground in order to perform the cleaning operation. This can be accomplished by a wire rope 16, or the like, attached to tower washing system 10 and looped through a pulley, a block, or block and tackle, or other similar device (not shown) down to ground level and affixed to a winch or similar device to raise and lower tower washing system 10. In another embodiment, the raising and lowering can be accomplished by using an existing winch disposed on the turbine with controls preferably located at ground level. In a typical operation of the claimed invention, winch cable 16 is lowered to the ground and a user connects hook 18 to tower washer 10 and hoists it about four feet (4') above the ground to assemble tower washing unit 10 and connect pressure washer hose 20. The various parts to be assembled are described below. Once tower washer 10 is assembled, a power washer (not shown) hooked up to pressure washer hose 20 is turned on, the winch operator begins to raise tower washer 10 beginning the cleaning process. It might be necessary to repeat the raising and lowering process of the device depending on condition of tower 12. For best results a high pressure power washer with 4000 PSI or greater pressure is used and also has a built in water heater.

Figure 2:
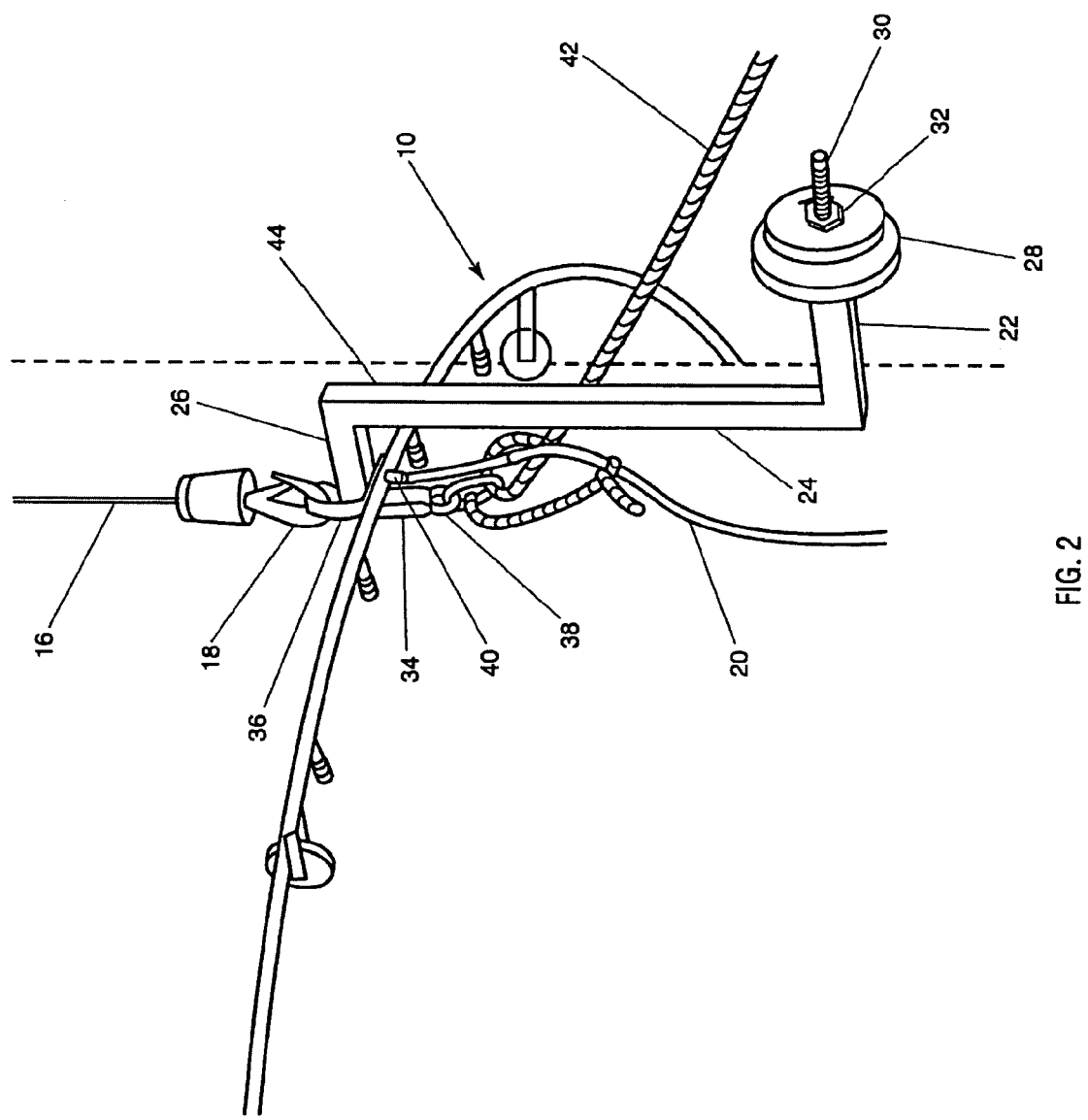
FIG. 2 is a close up view of the tower washer of FIG. 1.

FIG. 2 shows a close up of tower washer 10 and lifting structure 44. As shown, lifting structure 44 is made from square tubing cut and welded so as to resemble a "Z", but with 90 degree angles with longer vertical piece 24 to be about twenty four inches (24") long and top horizontal piece 26, about six inches (6") long, with bottom horizontal piece 22 about eight inches (8") in length. The Z configuration of lifting structure 44 is preferable to provide a counterbalance when tower washer 10 is raised and lowered. This is achieved by placing weights 28 on bottom horizontal piece 22 over a threaded ¾" rod 30 welded horizontally so weights 28 can be inserted on rod 30 and securely fastened with nut 32. In addition, attached to top horizontal piece 26 is fastener 34, which is shown as a custom fabricated ¼" plate with a top aperture 36 for accepting hook 18 for raising and lowering tower washer 10, and lower aperture 38. Lower aperture 38 is used for securing pressure-washer hose 20, via a strap or rope, to avoid the possibility of it falling in the event it should come loose from quick-connect fitting 40 used to connect hose 20 to tower washer 10 device, and can also be used to attach a "tag" line 42 to further secure tower washer 10 in case of possible wind gusts.

Figure 3:
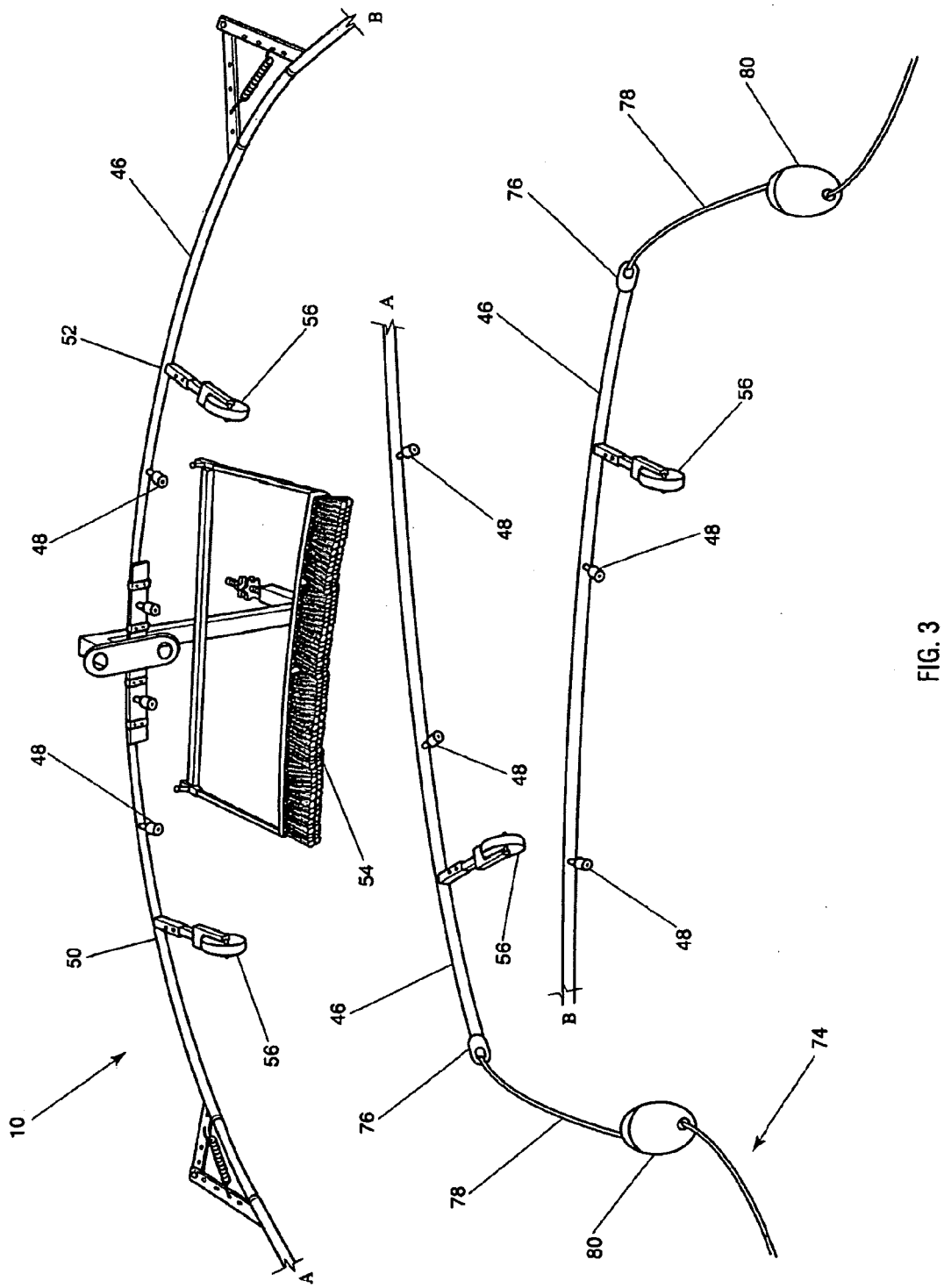
FIG. 3 is an exploded view of the tower washer showing the components therein.
Figure 5:
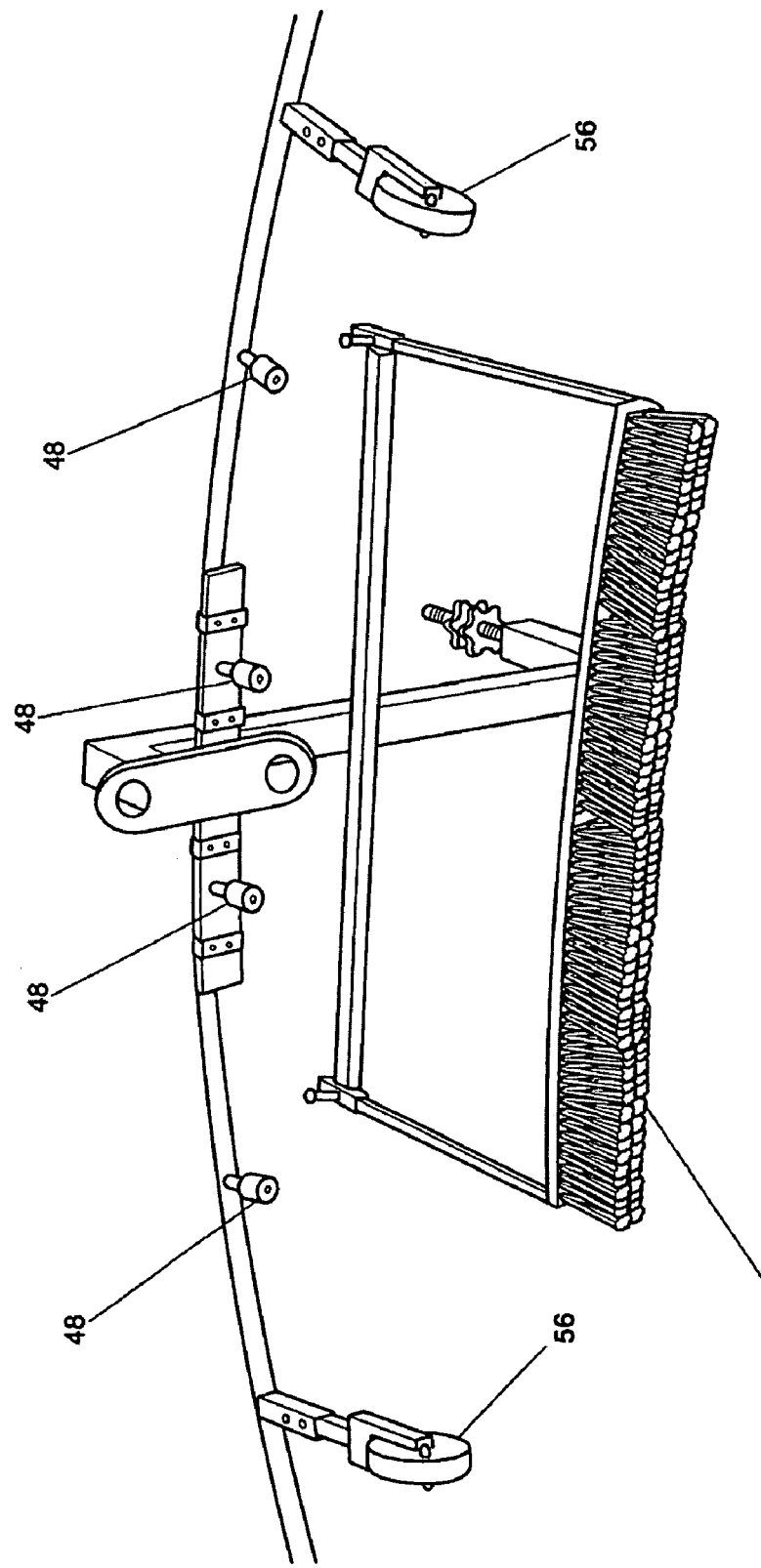
FIG. 5 shows a close up view of the spray nozzles and the optional brush attachment.

FIG. 3 shows the tower washer 10, the components, and construction. Semi-circular tube 46 carries the high pressure liquid that is sprayed onto tower surface 12 via a plurality of spray nozzles 48. Semi-circular tube 46 is preferably a pipe, cut approximately three feet (3') in length and threaded so it can be screwed to a "tee" on both sides. Tee accepts a quick connect to power washer hose 20 and connects to right side tube 50 and left side tube 52 of semi-circular tube 46. The pipe must also be formed to approximate the diameter of tower 12. The other end needs to be threaded also to allow "caps" to be installed. Both pipes need to be drilled and tapped to accept ⅜" couplers to attach the quick-connect fittings for spray nozzles 48, in this case approximately twelve inches (12") apart and facing towards tower surface 12. Optionally, brushes 54 can be affixed in between spray nozzles 48. Brushes 54 can be affixed to lifting structure 44, as shown, or in any other method well known in the art. Preferably, brushes 54 are adjustable to maintain contact with tower surface 12. To aid tower washer 10 in moving up and down tower surface 12, rolling members 56 such as wheels are also affixed to tower washer 10, as shown. Preferably wheels 56 are disposed in a fork and are adjustable to maintain contact with tower surface 12. The number and placement of wheels 56 for the tower washer 10 can be optimized for smooth lifting and lowering operation. FIG. 5 more clearly shows the configuration of brushes 54 and adjustability of the same, wheels 56 and adjustability of the same and nozzles 48.

Referring again to FIGS. 1 and 3, a compressing apparatus 74 creates pressure and pulls the end of semicircular tube 46 together creating a hugging effect on tower surface 12. On each end of semicircular tube 46 is attached a loop 76, such as welded rings, to complete a full circle around tower 12 with a compressing device 78, such as a piece of bungee cord. To assist the movement of the compressing device 78 and to prevent it from binding on tower surface 12, the compressing device can be threaded through rolling beads 80, such as commercially available buoys. This is done by attaching one side of bungee cord 78 to loop 76 on one end of the end-pipes, and thread the cord through buoys 80, tying knots on both ends to hold them apart evenly, and space the buoys about 12" to 18" from each other. Once they are evenly spread throughout the cord, pull the other end of bungee cord 78, stretching it tight (about 15 pounds of pressure) and tie the other end of the cord to loop 76 on the other end of the pipe.

Figure 4:
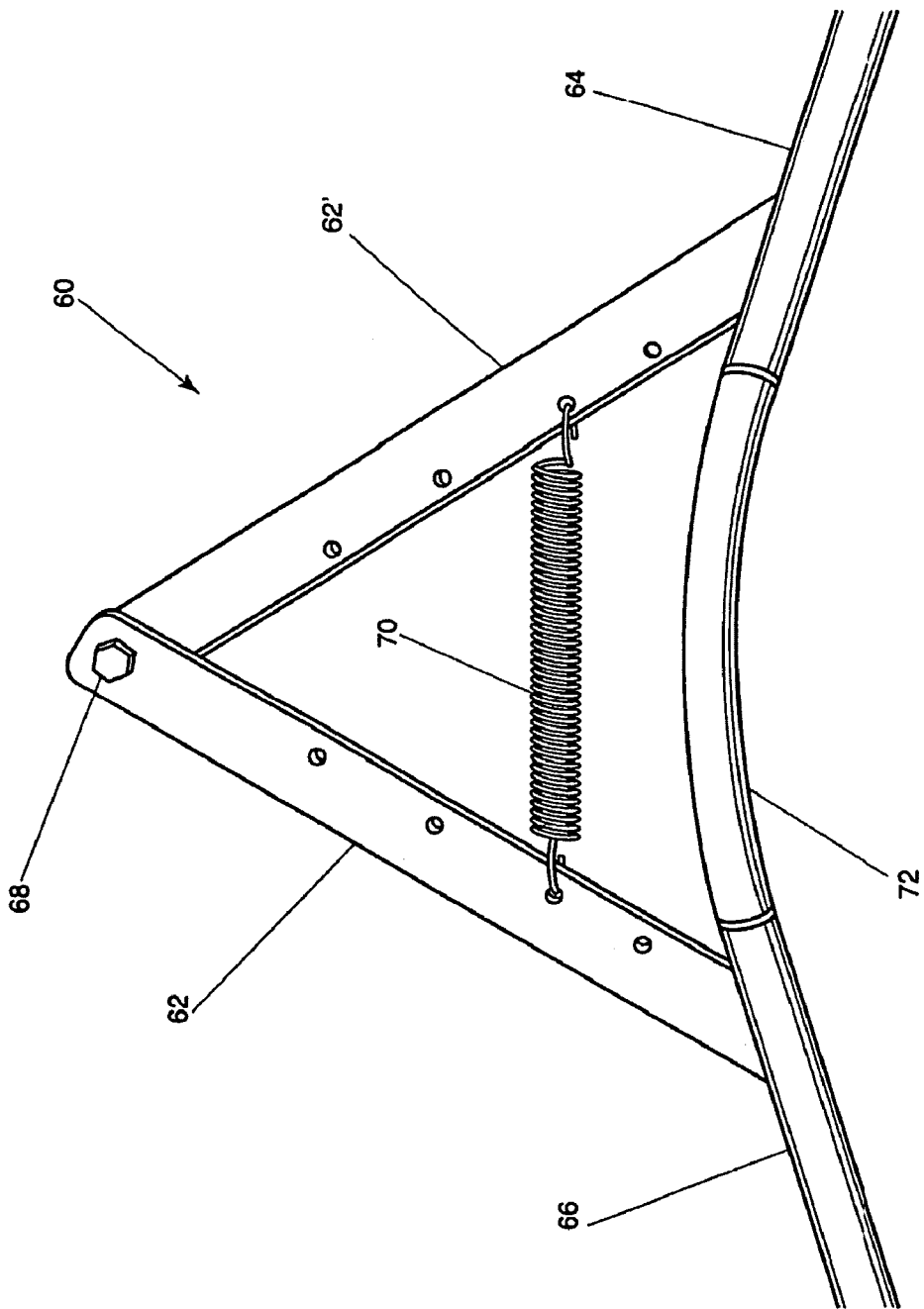
FIG. 4 is a close up view of the compressing apparatus.

FIG. 4 shows an optional method of keeping tower washing apparatus 10 compressed against tower surface 12. In this embodiment spring loaded scissor apparatuses 60 can be used. Each scissor blade 62 and 62' are affixed by a well known method such as welding or bolts to a first end 64, and a second end 66 of semi-circular tube 46. A pivot point 68 is created by a bolt or the like on an end of scissor blades 62 and 62' and is forced towards a closed state by spring 70 attached to scissor blades 62 and 62', as shown. In another option, a flexible hose 72 can be used to feed additional spray nozzles on the second end of semi-circular tube 46. As shown in FIG. 4, the high pressure fluid travels from first end 64 to second end 66 of semi-circular tube 46 a flexible high pressure hose 72 is connected. If nozzles are not disposed on second end 66, an end cap (not shown) can be attached to first end 64.

Although the claimed invention has been described in detail with particular reference to these preferred embodiments, other embodiments can achieve the same results. Variations and modifications of the presently claimed invention will be obvious to those skilled in the art and it is intended to cover in the appended claims all such modifications and equivalents. The entire disclosures of all references, applications, patents, and publications cited above, are hereby incorporated by reference.

What is claimed is:

1. An apparatus for cleaning a surface of a tapered tower, the apparatus comprising:
   a semicircular shaped assembly comprising a plurality of spray nozzles and a plurality of rolling members;
   at least one contracting member, comprising a bungee device and a plurality of rolling beads, for continually pressing the rolling members of the semicircular shaped assembly toward the tapered tower surface; and
   a system for raising and lowering the cleaning apparatus.

2. The apparatus of claim 1 further comprising a counterweight assembly affixed to the semicircular shaped assembly.

3. The apparatus of claim 1 wherein the at least one contracting apparatus comprises at least one spring loaded scissor apparatus.

4. The apparatus of claim 1 further comprising a washing fluid delivery apparatus for providing washing fluid to the plurality of nozzles.

5. The apparatus of claim 1 wherein the semicircular shaped member comprises a tube and a fluid fitting.

6. The apparatus of claim 1 further comprising at least one brush affixed to the semicircular member in contact with the surface.

7. A system for cleaning a surface of a tapered wind turbine tower, the system comprising:
   a semicircular shaped tubular member comprising at least one nozzle and at least one rolling member, the at least one rolling member being in contact with the surface of the tapered wind turbine tower;
   a counterweight attached to the semicircular shaped tubular member;
   a constricting apparatus, comprising a bungee device and a plurality of rolling beads in contact with the tower surface, for pressing the at least one rolling member to the surface of the tapered wind turbine as the semicircular shaped tubular member is raised and lowered;
   a raising and lowering apparatus for raising and lowering the semicircular shaped tubular member.

8. The system of claim 7 wherein the at least one rolling member is configured to provide a constant distance between the at least one nozzle and the tower surface.

9. The system of claim 8 wherein the constant distance is adjustable.

10. The system of claim 7 wherein the constricting apparatus comprises at least one spring loaded scissor apparatus.

11. The system of claim 7 further comprising at least one brush apparatus affixed to the semicircular shaped tubular member, the at least one brush apparatus configured to contact the tower surface.

12. A method for washing an outer surface of a tapered tower, the method comprising the steps of:
providing a semicircular member, the semicircular member comprising at least one spray nozzle and at least one rolling member in contact with the outer surface;
introducing a washing fluid to the at least one spray nozzle;
compressing the semicircular member to the outer surface with an elastic tension device, comprising a bungee device and a plurality of rolling beads in contact with the outer surface of the tapered tower; and
raising or lowering the semicircular member onto the outer surface of the tapered tower.

13. The method of claim 12 wherein the step of introducing the washing fluid comprises delivering the washing fluid to a fitting disposed in the semicircular member, wherein the semicircular member is a tubular structure.

14. The method of claim 12 further comprising the step of counterbalancing the semicircular member with weights.

15. The method of claim 12 further comprising the step of brushing the tower surface with at le6st one brush affixed to the semicircular member.

16. The method of claim 12 wherein the step of raising or lowering comprises affixing the semicircular member to a winch.

17. The method of claim 12 wherein the step of introducing the washing fluid comprises providing a pressurized fluid.

18. The method of claim 12 wherein the step of introducing the washing fluid comprises providing a heated washing fluid.

19. The method of claim 12 wherein the elastic tension device further comprises a spring loaded scissor apparatus.

* * * * *